United States Patent [19]

Berg et al.

[11] 3,923,707

[45] Dec. 2, 1975

[54] PROCESS FOR THE PRODUCTION OF POURABLE, PULVERULENT RUBBERS

[75] Inventors: Gerhard Berg; Karl-Heinz Nordsiek, both of Marl, Germany

[73] Assignee: Chemische Werke Huls Aktiengesellschaft, Marl, Germany

[22] Filed: June 18, 1974

[21] Appl. No.: 480,598

[30] Foreign Application Priority Data
June 20, 1973 Germany............................ 2331299

[52] U.S. Cl................ 260/17 R; 252/525; 252/528; 260/29.7 M; 260/29.7 N; 260/29.7 T; 260/29.7 PT; 260/29.76 P; 260/34.2; 260/567.6 M; 260/584 B; 260/879; 260/880
[51] Int. Cl.².... C08L 1/08; C08L 9/00; C08L 9/08
[58] Field of Search.. 260/29.7 EM, 29.7 N, 29.7 T, 260/29.7 PT, 29.7 GP, 567.6 M, 17 R, 34.2, 584 B, 879, 880 B; 252/528, 525

[56] References Cited
UNITED STATES PATENTS

| | | | |
|---|---|---|---|
| 2,979,528 | 4/1961 | Lundsted......................... | 260/584 B |
| 3,706,676 | 12/1972 | Franke et al.................... | 260/584 B |
| 3,846,365 | 11/1974 | Berg et al...................... | 260/33.6 AQ |

OTHER PUBLICATIONS

Ott et al.—High Polymers (Vol. 5), Cellulose (Part 2), (Interscience), (N.Y.), (1954), p. 930.
Shigeyoshi—Chem. Abs. 77, 21883v, (1972).
Katsura et al.—Chem. Abs. 77, 75778h, (1972).

*Primary Examiner*—M. J. Welsh
*Assistant Examiner*—H. H. Fletcher
*Attorney, Agent, or Firm*—Millen, Raptes & White

[57] ABSTRACT

A process for preparing discrete, finely divided, tack-free, pourable, powdery, filler-free elastomer particles by emulsifying rubber solutions in water with an amine emulsifier and precipitating the emulsions, wherein rubbers are utilized which contain crystalline and/or thermoplastic proportions arranged in block form; these rubber solutions are emulsified in water in the presence of emulsifiers; the emulsions are continuously introduced into hot water optionally containing precipitants; the rubber solvent is simultaneously distilled off continuously; and the rubber, thus obtained in a finely particulate form, is separated from the water and dried in a controlled temperature range.

11 Claims, No Drawings

3,923,707

PROCESS FOR THE PRODUCTION OF POURABLE, PULVERULENT RUBBERS

BACKGROUND OF THE INVENTION

This invention relates to the preparation of discrete, filler-free, finely divided, tack-free elastomer particles. More particularly, this invention relates to a process for preparing such particles from solution of an elastomer in an organic solvent.

The processing of thermosetting elastomers into shaped objects is normally a multistage procedure. In contrast to the manufacture of molded components from thermoplastic synthetic resins, it is absolutely necessary, prior to the final shaping step, to conduct a generally complicated mixing process to obtain homogeneous incorporation of diverse additives prior to the cross-linking reaction. The high viscosity of the raw materials and their handling in bale form makes it necessary to utilize heavy machines, e.g. rolling mills or internal mixers, which perforce require a high energy consumption. The inherent considerable costs of such energy and equipment greatly impair the economy of the production of elastomeric materials.

The statistical distribution homogeneity required of the various components in the elastomer mixtures necessitates, in addition to high equipment investment costs, considerable expenditures in time and energy. During solid state homogenization, the rubber particles are displaced against a strong resistance with respect to one another. Even those portions of the mixture which are sufficiently homogeneous must be further subjected to the mixing procedure until a satisfactory dispersion of the entire mixture has been achieved. The frictional heat generated requires a discontinuous mode of operation. In order to minimize the danger of premature vulcanization, at least a portion of the vulcanizing agents are not added until a second operating step. However, the preparation of crosslinkable elastomers sufficiently stable for even intermediate storage periods requires expensive measures and is effected, in modern large-scale plants, by expensive pelletizing and storage in rotating containers. Further processing involves the subsequent preparation of a blank on calenders and/or an extruder, depending on the type of the finished article. The conventional production method is then completed by vulcanization in presses or autoclaves.

Due to the characteristic properties of the raw elastomer material, severe limitations have been encountered in numerous attempts to device economical, and especially automated manufacturing methods. In order to simplify the aforementioned operating steps, masterbatches comprising coprecipitates of aqueous elastomer emulsions with carbon black have been proposed, by means of which other mixture components can be incorporated. However, due to their strong inherent tackiness, such raw elastomer mixtures are commercially prepared as bales of hard, solid consistency analogous to the filler-free polymers. Consequently, in spite of cost savings in producing the basic mixture, the machinery traditionally utilized for further processing operations could not be eliminated.

Therefore, many efforts are now being directed toward adapting rubber technology to the principles of thermoplastic processing. An ideal starting point to attain this objective is rubbers in pulverulent form. Starting with the advantageous possibilities afforded in transportation and storage, the provision of automated feeding and conveying devices promises considerable savings in the feeding of mixing-and-deformation units. In order to incorporate additional ingredients, powder mixing plants can be utilized, which operate under very much more economical conditions. Thus, a continuous processing technique employing a high degree of automation has moved into the realm of possibility for the rubber industry.

In order to put the above-described ideas into practice, methods which appeared suitable for the production of corresponding pulverulent rubber substances have already been suggested. Thus, German Unexamined Laid-Open Application DOS 2,135,266 and corresponding U.S. Pat. 3,846,365, the contents of which are incorporated by reference herein, disclose a process according to which discrete, finely divided, tack-free pourable elastomer particles are prepared from a filler-containing aqueous elastomer emulsion containing an aqueous emulsion of an elastomer dissolved in a volatile inert organic solvent having an emulsifying amount of quaternary ammonium salt cationic surfactant and an aqueous suspension or dispersion of a solid, finely divided elastomer filler, which process comprises gradually introducing the filler-containing aqueous elastomer emulsion into an aqueous alkali silicate solution while maintaining the solution at a pH of 7 – 14 and simultaneously evaporating the organic solvent to form discrete, finely divided, tack-free elastomer particles. The process can be applied to solid elastomers or to post-polymerization elastomer solutions, and is particularly suitable for preparing pourable carbon black-containing elastomer particles to be directly formed into shaped objects.

It has furthermore been suggested in German Patent Application P 22 14 125.5 and coresponding U.S. Pat. application Ser. No. 343,433 filed 3/21/73, the contents of which are incorporated by reference herein, to produce pourable, pulverulent rubber mixtures by emulsifying rubber solutions, optionally containing mineral oil plasticizers, in water in the presence of alkylamine oxyalkylates; introducing into these emulsions suspensions of solid fillers, preferably carbon blacks, optionally containing emulsifiers; continuously introducing the filler-containing, aqueous emulsions of the rubber solutions into hot aqueous alkali silicate solution, wherein the pH during the entire precipitation step ranges between 0.1 and 7, preferably between 1.0 and 3.5; simultaneously and continuously distilled off the rubber solvent; separating the thus-obtained, finely divided filler-containing rubber mixture from the water; and drying the product.

Another process for preparing pourable, filler-containing elastomer particles is described in U.S. Patent application Ser. No. 421,819 filed 12/5/73, the contents of which are incorporated by reference herein, wherein an admixture of a rubber solution and filler is flash-evaporated.

The rubber mixtures obtained according to these processes lead to considerable advantages along the desired and above-described path toward a simplified processing technique, thanks to their special phase condition, i.e. as finely divided powdery particles.

However, it would also be advantageous for certain fields of application to have available filler-free pulverulent rubber mixtures. A transfer of the aforementioned processes to the production of filler-free mixtures is not readily possible because specific rubbers with respect to their typical microstructure are to be elected.

OBJECTS OF THE INVENTION

Accordingly, it is an object of this invention to provide a process for preparing discrete, finely divided pourable and tack-free elastomer particles.

Another object of this invention is to provide a process for preparing discrete, finely divided pourable and tack-free elastomer particles from a solution of an elastomer in an inert organic solvent.

A further object of this invention is to provide a process for preparing discrete, finely divided pourable and tack-free elastomer particles which are free of fillers.

An additional object of this invention is to provide a process for preparing discrete, finely divided, tack-free elastomer particles containing a mineral oil plasticizer.

A more particular object of this invention is to provide pourable filler-free butadiene-styrene, ethylene-propylene or EPDM sequence types of elastomer particles.

Other objects and advantages of this invention will become apparent to those skilled in the art upon further study of the specification and appended claims.

SUMMARY OF THE INVENTION

Briefly, the above and other objects are attained in one aspect of this invention by providing a process for preparing discrete, finely divided, tack-free elastomer particles by emulsifying rubber solutions in water containing emulsifiers and precipitation from the emulsions and drying of the rubbers, wherein solutions of such rubbers are utilized which contain crystalline and/or thermoplastic proportions arranged in block form; these rubber solutions are emulsified in water in the presence of emulsifiers; the emulsions are continuously introduced into hot water optionally containing precipitants; the rubber solvent is simultaneously distilled off continuously; and the rubber, thus obtained in a finely particulate form, is separated from the water and dried in a controlled temperature range.

DETAILED DISCUSSION

It has surprisingly been found possible to produce pourable, pulverulent rubbers by the emulsification of rubber solutions in water containing emulsifiers and precipitation from the emulsions and drying of the rubbers, if solutions of those rubbers are used which contain crystalline and/or thermoplastic proportions arranged in blocks; these rubber solutions are emulsified in water in the presence of cationic amine surfactants; the emulsions are continuously introduced into hot water optionally containing precipitants; the rubber solvent is simultaneously distilled off continuously; and the rubber, obtained in this process in finely divided form, is separated and dried in a controlled temperature range.

Therefore, this invention provides a combination of the above measures which is critical to the process, by means of which it now becomes possible to produce filler-free, pourable, pulverulent rubber mixtures.

Suitable rubbers for use in the process of this invention are elastomeric polymers which contain crystalline and/or thermoplastic proportions arranged in block form. Primarily applicable in this connection are the conventional ethylene-propylene copolymers as well as ethylene-propylene-diene terpolymers wherein the ethylene content ranges between 65 and 80 weight percent and the Raman crystallinity of which is between 0.3 R and 1.5 R; see "Zeitschrift fuer Analytische Chemie" (Periodical of Analytical Chemistry) 258:199 (1972).

Rubbers of such a microstructure have become known in the meantime as so-called EPM- or EPDM-sequence types, e.g. see Kerrutt, Kautschuk und Gummi, 26, (1973), pages 373 to 382.

The proportion of double bonds optionally introduced by a ternary component is generally 1–30 moles per 1000 carbon atoms, preferably 6–12 moles per 1000 carbon atoms, as determined by infrared spectroscopy.

Preferred ternary components are ethylidene norbornene, 1,4-hexadiene and dicyclopentadiene, especially ethylidene norbornene. The solution viscosity ranges between 0.5 and 5.0 dl./g., preferably between 1.5 and 2.8 dl./g. measured according to DIN 53 728 on a solution in decaline at 135° C. Furthermore, suitable are blends of such EPM- or EPDM- sequence types with conventional amorphous ethylene-propylene copolymers which can similarly have a variable content of vulcanizable double bonds due to the incorporation of ternary components. The ratio of the blend is determined by the Raman crystallinity of the EPM- or EPDM- sequence type utilized. For example, in using copolymers and/or terpolymers with ethylene contents of 80%, the blend weight ratio of sequence types to amorphous normal types can be 30–70. See: Lauria, A.J., ACS Rubber Division Meeting, San Francisco, May 1966; Ballini, G., International Rubber Convention, Moscow, November 1969.

Other suitable rubbers to be utilized within the scope of the process of this invention are the copolymers of butadiene with styrene and/or α-methylstyrene, producible in solution with the aid of alkali metal catalysts, having a partial or predominantly block-type arrangement of the starting monomers. The molar ratio of butadiene to styrene and/or α-methylstyrene ranges between 1:1 and 6:1. The proportion of the styrene quantity incorporated in block form is, depending oon the butadiene-styrene ratio, 20–100% of the total styrene content and at least about 20 mol % of the polymer structure. Consequently, a copolymer with a high butadiene-styrene ratio of 6 : 1 must have essentially the entire styrene proportion in a block arrangement, while with a low ratio of 1 : 1, a percentage styrene proportion in block form of 20% is sufficient. The cis-trans-double bonds, as well as the proportion of butadiene units in the 1,2-position in the polybutadiene proportion are statistically randomly distributed along the molecular chains.

Furthermore, suitable are polybutadienes containing 10–30% trans-1,4-double bonds in steric block configuration, e.g. prepared according to the process of U.S. Pat. No. 3,829,409.

The term "elastomer" as used herein refers to those synthetic polymers which have a high tensile strength in the solid state and which stretch under tension and retract rapidly to their original dimensions. The term "vulcanizable" as used herein refers to those elastomers which are sufficiently uncrosslinked to be soluble in a suitable organic solvent having a boiling point below that of water and which are capable of being crosslinked, e.g. by vulcanization, into a relatively insoluble form.

Preferred elastomers are those which have been prepared by solution polymerization using an ionic catalyst, e.g. the Ziegler-Natta or lithium-based catalysts in an inert organic solvent having a boiling point below that of water. Solutions of these elastomers can be converted directly into pourable particles without intermediate recovery of the polymerization product. Preferred elastomers in this connection are rubbery block polymers, e.g. styrene-butadiene, polybutadiene stereo block homopolymers ethylene-propylene sequence types and ethylene-propylene-diene sequence types.

The elastomer solutions used in this invention contain 4 to 25, preferably 6 to 15, percent by weight of elastomer. The use of greatly excessive amounts of solvent is possible but requires more stringent conditions to evaporate the solvent during the precipitation step.

The solvents useful in this invention can be any liquid organic compound in which the elastomer is soluble and which are volatile, i.e. which have a boiling point below that of water in the aqueous emulsion of the elastomer-solvent solution in water, These volatile solvents, which generally boil at least 10°C and preferably at least 20°C below the boiling point of water and which are inert, i.e. do not deleteriously react with the elastomer under the reaction conditions encountered in the process of this invention, are known in the art. Solvents or solvent mixtures which form an azeotrope, especially a negative azeotrope, with water are preferred. Suitable inert organic solvents meeting these criteria include but are not limited to alkanes and cycloalkanes: preferred are linear or branched alkanes of 5-8 carbon atoms, e.g. pentane, hexane, heptane and isooctane.

The rubber solutions can be alternatively obtained by the redissolution of finished polymers, thus also making emulsion polymers amenable to the process of the present invention.

Suitable emulsifiers within the framework of this invention are cationic surface-active amine derivatives, preferably quaternary ammonium salts.

The quaternary ammonium salts useful in this invention are cationic surface-active organic nitrogen compounds having a structure which includes a central nitrogen atom joined to four organic groups as well as to an acid radical, and include pentavalent ring compounds, e.g. lauryl pyridium chloride. Preferred quaternary ammonium salts are those of the formula $(NR_1R_2R_3R_4) X$ wherein $R_1$, $R_2$, $R_3$ and $R_4$ are each aliphatic, particularly alkyl of 1-20 carbon atoms or araliphatic, particularly aralkyl of 6-20 carbon atoms, especially benzyl, and X is halogen, preferably chlorine or bromine, bisulfate or sulfate. Especially preferred are compounds of the above formula wherein at least two or $R_1$, $R_2$, $R_3$ and $R_4$ are lower alkyl of 1-3 carbon atoms, particularly methyl or ethyl, and wherein one of $R_1$, $R_2$, $R_3$ and $R_4$ is an aliphatic hydrocarbon radical of 12-18 carbon atoms. Preferred pentavalent ring-containing quaternary ammonium salt emulsifiers are the N-substituted pyridine salts, especially those substituted on the nitrogen atom with an aliphatic hydrocarbon group of 12-18 carbon atoms, particularly alkyl.

Suitable quaternary ammonium salt emulsifiers include but are not limited to lauryldimethylbenzylammonium chloride, cetyltrimethylammonium bromide, lauryldimethylethylammonium ethyl sulfate, alkyl ($C_{12}$ to $C_{16}$)-trimethyl-ammonium bromide, coconut dimethylbenzylammonium chloride, cetyldimethylbenzylammonium chloride, cetyldimethylethylammonium ethyl sulfate, distearyldimethylammonium chloride, as well as N-substituted salts of pyridine, e.g. laurylpyridinium chloride, cetylpyridinium bromide, tetradecylpyridinium bromide and laurylpyridinium bisulfate. Emulsifying amounts of these quaternary ammonium salts are suitably 0.05-2%, preferably 0.1-1%, based on the weight of the elastomer solution. The pH of the aqueous solution in non-basic, i.e. pH 0.1-7, preferably pH 3-7.

Furthermore suitable as amine derivatives are alkylamine oxyethylates of the general formula

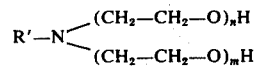

wherein

R' represents a preferably linear alkyl or alkenyl group of 1-30, preferably 10-20 carbon atoms and $n$ and $m$ represent integers between 1 and 80, preferably from 6 to 20. Suitable such compounds include but are not limited to lauryl-, myristyl, cetyl-, stearyl-, and oleylamine oxyethylates.

The aforementioned emulsifiers can be combined advantageously with minor amounts of high-molecular weight, water-soluble colloids, preferably cellulose derivatives or alkali polyacrylates and/or alkali polymethacrylates. Suitable cellulose derivatives are water soluble in the amounts employed.

Preferred such cellulose derivatives are the methylcelluloses, hydroxyethylcelluloses, hydroxypropylmethylcelluloses, hydroxyethylmethylcelluloses and carboxymethylcelluloses.

Suitable alkali polyacrylates and/or alkali polymethacrylates are similarly water soluble compounds having number average molecular weights of 100,000 – 2,000,000, preferably 500,000 – 1,250,000.

By this modification of the emulsifier, the shelf stability of the rubber-solution emulsion is considerably improved. The quantitative ratio of emulsifier to the water soluble colloid generally ranges between 6 : 1 and 120 : 1, preferably about 10 : 1 and 50 : 1.

Suitable precipitants are aqueous solutions of water soluble alkali silicates. Alkali silicate solutions are preferably sodium silicate solutions haviing molar ratios of $Na_2O : SiO_2$ of 2 : 1 to 1 : 4. The amounts of $SiO_2$ contained in the alkali silicate solution, which are necessary for precipitation, are generally 0.5-20 moles, preferably 1-8 moles per mole of the quaternary ammonium salt.

The pH of the aqueous alkali silicate solution is maintained below 7, preferably between 3 and 7, in order to destabilize the alkylamine oxyethylate and above pH 7 when similarly destabilizing the quaternary ammonium salt.

The aqueous elastomer emulsion is gradually introduced into the alkali silicate solution either batchwise or continuously under conditions which simultaneously remove the organic solvent component, preferably at a rate whereby the solvent is removed as rapidly as it is introduced. While these conditions can be provided by various means, e.g. evaporation under reduced pressure, it is advantageous to effect removal of the organic solvent component by providing a hot aqueous alkali silicate solution at a temperature above the boiling point of the inert organic solvent in the aqueous emulsion. In this connection, the use of an inert organic solvent which forms a negative azeotrope with water is especially advantageous due to the low boiling point of the azeotrope.

The process of this invention thus involves the following measures: The elastomer solutions which optionally contain a mineral oil plasticizer and which are preferably a solution of elastomer in a volatile, normally liquid aliphatic hydrocarbon, are emulsified in water, in the presence of the quaternary ammonium slats of the present invention, with the aid of dispersing devices, e.g. agitators, mills, ultrasonic mixers or mixing nozzles. The emulsification is conducted in most cases at room temperature; however, it may in some cases be advantageous to operate at elevated temperatures of up to 200°C under superatmospheric pressure sufficient to maintain the liquid phase.

The weight ratio of the aqueous phase to the organic solvent phase in the aqueous emulsion is generally 0.25 to 2.5 : 1, preferably 0.5 to 1.5 : 1. Following emulsification, any solid auxiliary agents required for the vulcanization, e.g. antiaging agents, zinc oxide, stearic acid, sulfur, and vulcanization accelerators, etc. are introduced into the emulsion. The aqueous emulsion of the elastomer solution obtained in this way and containing all auxiliary agents is gradually, preferably continuously, introduced into a hot aqueous precipitating bath.

The precipitation procedure and the distilling off of the solvent are conducted in a single step without troublesome foam formation, preferably under agitation, at temperatures above the azeotrope boiling point of the organic solvent and water. The filler-containing aqueous elastomer emulsion is gradually introduced into an alkali silicate solution. In this procedure, the elastomer mixture which optionally contains mineral oil plasticizers is obtained in an unusually finely particulate, non-tacky form, wherein the average diameter of the particles vary between 1 and 1800 $\mu$, preferably between 50 and 800 $\mu$. The elastomer mixture, produced in a finely divided form after the precipitation and after removing the organic solvent, is freed of the main amount of water, i.e. generally 98.5 to 99.8% of the water present is removed, e.g. by conventional filtration or decantation on screens, rotary cellular filters, suction filters, centrifuges, or the like and is dried according to conventional methods, e.g. in belt dryers, drum dryers, fluidized-bed or spray-drying plants, preferably under continuous movement. The drying temperatures employed must not result in heat transfer to the particles which exceeds the softening point at the surface thereof, preferably at least 5° to 10 °C below the elastomer softening point. The thus-obtained elastomer particles are pourable, tack-free, i.e. exhibit extremely little if any tackiness, and can be ground, if necessary, into powders of any desired grain sizes, e.g. in suitable mills.

In addition to preparing directly vulcanizable particulate elastomer compositions, the present invention can be utilized to prepare intermediate particulate compositions into which additives can be subsequently incorporated prior to vulcanization.

In a further embodiment of the present invention, the pourable elastomer particles produced according to this invention are used for the production of molded or extruded shaped elastomer articles, optionally with the concomitant employment of additional auxiliary agents, and either with or without the use of further plasticizing treatment. The vulcanized products of this invention demonstrate a physical property spectrum comparable to samples mixed under conventional mechanical conditions, i.e. those described by S. Bostrom, Kautschuk-Handbuch, volume 2 (1960), chapter 2, "Verarbeitungstechnik".

If auxiliary agents are to be admixed to the particulate elastomer mixtures for further processing at a later date, it is possible to conduct such admixing by means of very simple agitator systems, e.g. the Loedige, Papenmeier or Henschel mixers. For purposes of final shaping, the powder mixture can be directly fed into extruders, calenders, transfer molding systems or automatic injection molding machines. When introducing the elastomer mixture of the present invention into a rolling mill, a smooth sheet is obtained after only a single pass. The conversion from the powdery into the plastic state thus requires only minimum expenditure. Consequently, it is possible in a surprisingly simple manner to utilize the elastomer mixture directly in the final stage of the conventional elastomer processing operation, without the use of heavy mechanical devices. In this way, it is possible to manufacture directly insoluble elastomer articles usable with a reduced number of production stages using economical and automated processing methods, and with greatly reduced investment costs.

The invention will be explained in greater detail with reference to the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. Unless otherwise indicated, all percentages are by weight. Comparison materials used as controls were prepared in the following way: The elastomer is kneaded in an internal mixer type GK 2 one minute at an exterior temperature of 50°C and a rotation number of 40 rph. Then the compounding ingredients, e.g. carbon black, oil, zinc oxide, stearic acid, but without sulfur and vulcanization accelerator are added. The mixture is then kneaded for 9 minutes and then rolled. After a storage period of 6 hours, sulfur and a vulcanization accelerator are added on a mill at a temperature of 50 °C for 5 minutes. After this procedure the mixture is ready for the vulcanization.

EXAMPLE 1

200 kg. of a 10% solution of an EPDM rubber having an ethylene content of 74% and 6% ethylidene norbornene as the ternary component, corresponding to 8 double bonds per 1000 carbon atoms, a Mooney viscosity of 84 and a solution viscosity of 2,540 cp. at 20°C., obtained by the solution polymerization of ethylene, propylene, and dicyclopentadiene with the aid of a Ziegler catalyst in hexane, is emulsified in 100 l. of water with the aid of an emulsifying device (trade name "Supraton 456 D") in the presence of 1.2 kg. of cetyltrimethylammonium chloride (trade name "Dehyquart A") and 1 kg. of 10% sulfuric acid. The resultant stable, aqueous emulsion of the rubber solution, having a pH of 5.1, is introduced under continuous agitation into a 3 m³ vessel filled with a solution of 9 kg. of an aqueous 26% sodium silicate solution in 900 liters of water heated to 80°–90° C. While the hexane is distilled off simultaneously, the rubber is immediately obtained as a finely particulate, pulverulent coagulate which, after the hexane has been completely exhausted, is vacuum-filtered and dried at 40°C. within 80 minutes in a vacuum plate dryer. A pourable, pulverulent rubber is obtained.

EXAMPLE 2

200 kg. of the EPDM rubber solution described in Example 1 is similarly emulsified in 200 liter of water in the presence of 600 g. of cetyltrimethylammonium chloride (trade name "Dehyquart A") and 40 g. of methylcellulose (trade name "Walsroder MC 20 000 S") and 500 g. 10% sulfuric acid.

The rubber is precipitated from the aqueous rubber-solution emulsion following the procedure of Example 1 but employing only 4.5 kg. of the 26% sodium silicate solution. After the drying process, a pulverulent rubber product is obtained which can readily be ground in a hammer mill to powdery rubber having the desired particle size between 1 and 1800 microns, preferably between 50 and 800 microns in diameter.

EXAMPLE 3

120 kg. of a 10% solution of a block copolymer, obtained by solution copolymerization of butadiene and styrene in hexane with the aid of n-butyllithium as the catalyst, having a total styrene content of 25%, 20.5% thereof as a terminal block of polystyrene, an RSV value of 0.92, and a Mooney viscosity of 55, is similarly emulsified in 120 kg. of water containing 360 g. of laurylamine oxyethylate ($n + m = 12$ in the general formula) and 24 g. of a high-molecular sodium polyacrylate (trade name "Plex 367 F"). The pH of the thus-produced stable emulsion is adjusted to 11.6 by adding 50 g. of 10% sodium hydroxide solution. The stable alkaline emulsion is then stirred into a 3 m³ vessel containing as an aqueous precipitant a mixture of 300 kg. water, 1.5 kg. of an aqueous 23% sodium silicate solution and 12.3 kg. of 10% sulfuric acid, heated to 90°–95°C. The pH of the precipitant bath is about 1.8. While the solvent hexane is distilled off, the butadiene-styrene block copolymer is precipitated in finely divided form. After the hexane has been completely exhausted, the rubber is vacuum-filtered, dried in a vacuum drying chamber at 75°C., and ground in a hammer mill, thus obtaining a non-tacky pulverulent rubber having an average particle size between 1 and 1800 microns in diameter.

EXAMPLE 4

120 kg. of a 10% solution of a block copolymer obtained by solution copolymerization of butadiene and styrene in hexane as the solvent with the aid of n-butyllithium as the catalyst, having a total styrene content of 48%, of which 32% is in block form and an RSV value of 0.67, is emulsified in 120 kg. of water with the aforementioned emulsifying device in the presence of 310 g. of cetyltrimethylammonium chloride and 48 g. of methylcellulose (trade name Walsroder MC 20 000 S). The pulverulent rubber is isolated from the emulsion in accordance with Example 1 and exhibits similar properties.

EXAMPLE 5

120 kg. of an EPDM rubber solution prepared in accordance with Example 1 is mixed with 80 kg. of a 10% solution of an amorphous EPDM rubber containing about 8% dicyclopentadiene as the ternary component, corresponding to 8 double bonds per 1000 carbon atoms. The mixture, 200 kg. of a 10% strength solution, is emulsified in water and worked up according to Example 1 to yield a pulverulent product which can be ground without difficulty in a hammer mill to a powdery rubber having a particle size between 1 and 1800 microns in diameter.

EXAMPLE 6

550 g. of a pulverulent rubber produced according to Example 1 is introduced into a Henschel mixer having a capacity of 10 l. After 30 seconds of initial running time at a speed of 1800 r.p.m. and cooling of the jacket with tap water, there are successively added 165 g. of naphthenic processing oil ("Ingraplast NS"), 440 g. of FEF carbon black ("Corax A") and, as vulcanizing adjuvant, 5.5 g. of stearic acid, 27.5 g. of zinc oxide, 8.25 g. of N-cyclohexylbenzothiazole sulfenamide ("Vulkacit CZ"), 2.75 g. of diphenylguanidine ("Vulkacit D"), 2.75 g. of Vulkacit Thiuram and 8.25 g. of sulfur. The total mixing time is 550 seconds. A very fine particulate, well pourable rubber results, completely dry in its external consistency, which shows no tendency toward caking.

When fed to a rolling mill having a temperature of 50°C., a smooth sheet is formed in a few seconds. The compacted material is vulcanized at 150°C. The other portions of the rubber are subjected, prior to vulcanization, to treatment on a rolling mill having a temperature of 50°C. for 2.5 minutes and 5 minutes respectively. A fourth sample of the pulverulent rubber is fed directly to an extruder (screw 18 d; 4.5 cm. diameter; barrel temperature 70°C; die temperature 100°C). The vulcanizing data of the extruded product are likewise determined. All of these data are compared to the properties of a control sample of the corresponding solid rubber, the vulcanization mixture of which is produced in the same composition in a conventional manner by mixing with carbon black and oil in a masticator, and subsequent addition of sulfur and the accelerator on a rolling mill.

It can be seen from the table below that the mixtures produced under considerably reduced expenditure from the pulverulent rubber of this invention, particularly Experiment Nos. 2, 3, and 4 after a brief mechanical treatment possess virtually the same properties as obtained with samples prepared according to the very complicated and expensive conventional methods of the prior art illustrated by Experiment No. 5.

Physical property measurements given for the preceeding Examples were determined by standard testing methods. Tensile strength, % elongation, modulus E 300% and Permanent Elongation were all measured according to DIN 53 504. Shore Hardness was determined according to DIN 53 505; elasticity according to DIN 53 512; and Compression Set according to DIN 53 517.

RESULTS:

| Experiment No. | Method of Producing the Mixture | Heating Time at 150°C. | Strength kp./cm² | Elongation % | Modulus 300% kp./cm² | Permanent Elongation % | Hardness °Sh. | Elasticity % 20°C. | 75°C. | Compr. Set 22h/75°C. |
|---|---|---|---|---|---|---|---|---|---|---|
| 1 | Pulverulent rubber | 30′ | 109 | 444 | 85 | 36 | 74 | 34 | 39 | |

RESULTS:-continued

| Experiment No. | Method of Producing the Mixture | Heating Time at 150°C. | Strength kp./cm² | Elongation % | Modulus 300% kp./cm² | Permanent Elongation % | Hardness °Sh. | Elasticity % 20°C. | 75°C. | Compr. Set 22h/75°C. |
|---|---|---|---|---|---|---|---|---|---|---|
| | acc. to invention, compacted 20 sec. on rolling mill. | 60' | 115 | 386 | 96 | 21 | 75 | 34 | 39 | 29 |
| | | 120' | 116 | 346 | 105 | 21 | 76 | 33 | 37 | |
| 2 | Pulverulent rubber acc. to invention, treated 2.5 min. on a rolling mill. | 30' | 136 | 392 | 115 | 35 | 80 | 36 | 44 | |
| | | 60' | 142 | 350 | 125 | 25 | 80 | 36 | 44 | 22 |
| | | 120' | 145 | 332 | 128 | 23 | 80 | 36 | 44 | |
| 3 | Pulverulent rubber acc. to invention, treated 5 min. on a rolling mill. | 30' | 148 | 444 | 113 | 37 | 79 | 37 | 45 | |
| | | 60' | 145 | 386 | 120 | 27 | 79 | 37 | 45 | 22 |
| | | 120' | 155 | 412 | 125 | 26 | 79 | 37 | 45 | |
| 4 | Pulverulent rubber acc. to invention, directly extruded. | 30' | 144 | 456 | 114 | 31 | 79 | 36 | 44 | |
| | | 60' | 149 | 401 | 121 | 26 | 79 | 36 | 45 | 23 |
| | | 120' | 151 | 410 | 128 | 26 | 79 | 36 | 45 | |
| 5 | Mixture of solid rubber produced by masticator and rolling mill. | 30' | 145 | 406 | 123 | 42 | 80 | 37 | 44 | |
| | | 60' | 145 | 386 | 126 | 36 | 80 | 37 | 45 | 25 |
| | | 120' | 149 | 360 | 136 | 34 | 80 | 37 | 45 | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing discrete, finely divided, tack-free, pourable, powdery filler-free elastomer particles from an aqueous emulsion of an elastomeric polymer having crystalline or thermoplastic block sequences and selected from the group consisting of EPM- or EPDM block sequence copolymers having an ethylene content of 65–80% and a Raman crystallinity of 0.3–1.5 R; copolymers of butadiene with a styrene or α-methylstyrene vinyl aromatic monomer having a molar ratio of butadiene to the vinyl aromatic monomer of 1 : 1 – 1 : 6, 20–100% of the vinyl aromatic monomer being in block sequence form and constituting at least about 20 mol % of the copolymer structure; and stereohomopolymers of butadiene containing 10–30% trans-1,4 double bonds in a stereo block sequence configuration, said aqueous emulsion consisting essentially of (i) a solution containing 4–25% by weight of said elastomer dissolved in a volatile, inert organic solvent having a boiling point below 100° C., (ii) an elastomer emulsifying amount of about 0.05–2% of a surfactant amine derivative and (iii) water, the weight ratio of the aqueous phase to the organic solvent phase of said emulsion being from about 0.25 to 2.5 : 1, which process comprises:

gradually introducing said admixture into an aqueous alkali silicate solution containing 0.5 – 20 moles of $SiO_2$ per mole of said amine surfactant while maintaining said silicate solution at a pH which destabilizes the surfactant;

simultaneously evaporating said volatile organic solvent to form said elastomer particles; and drying said particles at a temperature below the softening point thereof.

2. A process according to claim 1 wherein the elastomer is an EPDM sequence type copolymer in which ethylidene norbornene, 1,4-hexadiene or dicyclopentadiene is the ternary monomer.

3. A process according to claim 2 wherein the proportion of double bonds introduced by the ternary component is 1–30 moles per 1000 carbon atoms.

4. A process according to claim 1 wherein the elastomer is a blend of EPM- and/or EPDM-sequence type copolymer with amorphous EPM and/or EPDM copolymers.

5. A process according to claim 1, wherein the elastomer is a block copolymer of butadiene with styrene and/or of butadiene with α-methylstyrene.

6. A process according to claim 5 wherein the butadiene/styrene and/or butadiene/α-methylstyrene ratio is about 1 : 1 to 6 : 1.

7. A process according to claim 6 wherein the proportion of styrene incorporated in block form is 20–100% of the total styrene content.

8. A process according to claim 1 wherein the surfactant is a quaternary ammonium salt in combination with one part by weight thereof of a water-soluble cellulose derivative.

9. A process according to claim 8 wherein 6–120 parts by weight of surfactant are employed in combination with one part by weight of a water-soluble cellulose derivative.

10. A process according to claim 1 wherein the surfactant is an alkylamine oxyethylate.

11. A process according to claim 10 wherein 6–120 parts by weight of surfactant are employed in combination with one part by weight of a water soluble polyacrylate salt having a number average molecular weight of 100,000–2,000,000.

* * * * *